United States Patent [19]
Leymann et al.

[11] Patent Number: 6,011,917
[45] Date of Patent: Jan. 4, 2000

[54] METHOD AND COMPUTER SYSTEM FOR GENERATING PROCESS MANAGEMENT COMPUTER PROGRAMS FROM PROCESS MODELS

[75] Inventors: Frank Leymann, Aidlingen; Dieter Roller, Schönaich, both of Germany

[73] Assignee: International Business Machines Corporation, Armonk, N.Y.

[21] Appl. No.: 08/737,259

[22] PCT Filed: Aug. 23, 1995

[86] PCT No.: PCT/EP95/03345

§ 371 Date: Nov. 7, 1996

§ 102(e) Date: Nov. 7, 1996

[87] PCT Pub. No.: WO97/08634

PCT Pub. Date: Mar. 6, 1997

[51] Int. Cl.[7] .................................................. G06F 9/40
[52] U.S. Cl. ............................................................ 395/702
[58] Field of Search ..................................... 395/701, 702

[56] References Cited

U.S. PATENT DOCUMENTS

| | | | |
|---|---|---|---|
| 5,159,687 | 10/1992 | Richburg ................................. | 395/702 |
| 5,187,788 | 2/1993 | Marmelstein ........................... | 395/703 |
| 5,201,046 | 4/1993 | Goldberg et al. ...................... | 707/100 |
| 5,555,367 | 9/1996 | Premerlani et al. ................... | 707/4 |
| 5,699,310 | 12/1997 | Garloff et al. ......................... | 395/701 |

FOREIGN PATENT DOCUMENTS

| | | | |
|---|---|---|---|
| PCT/US90/07013 | 11/1990 | WIPO ....................................... | 15/40 |
| PCT/US94/02468 | 3/1994 | WIPO ....................................... | 15/30 |

OTHER PUBLICATIONS

"IBM's FlowMark: Object–oriented Workflow for Mission-–Cirtical Applications", Ronni T. Marshak, Workgroup Computing Report, vol. 17, No. a5, pp. 3–13.

*Primary Examiner*—Tariq R. Hafiz
*Assistant Examiner*—John Q. Chavis
*Attorney, Agent, or Firm*—Gray Cary Ware Freidenrich

[57] ABSTRACT

A method is described for generating computer programs from process models, e.g., C++ computer programs. The generation of a computer program is based linearizing a process graph with respect to the sequence of activity execution, associating process model constructs to classes and methods of an object-oriented programming technique, and representing activities and data items as instances of classes. The generated computer programs can be compiled into executables and executed on a computer system. Advantageously, process instances can be executed on a computer system with significantly less resource consumption for managing the process instances.

14 Claims, 32 Drawing Sheets

```
class activity {
        int    actualNumberCCIn ;
        char   activityExecutionStatus ;

public :

int    getNumberCCIn() ;
        int    getActualNrCCIn () ;
        void   setActivityExecuted () ;
        char   activityExecuted () ;

```
void activity::incrActualNrCCIn ()
{
        actualNumberCCIn++ ;
} int activity::getActualNrCCIn ()
{
        return (actualNumberCCIn) ;
} void activity::setActivityExecuted ()
{
        activityExecutionStatus = ON ;
} char activity::activityExecuted ()
{
        return (activityExecutionStatus) ;
}
```

Fig. 4

```
class dataItem { protected :
        int     valueSet ;

public :
        dataItem ()
        int     testForValue () ;

```
dataItem::dataItem ()
{
        valueSet = OFF ;
} int dataItem::testForValue ()
{
        return (valueSet) ;
}
```

Fig. 6

```
class dataItemLong : public dataItem { long    value ;

public :
        void    copyValue (dataItemLong* sourceDataItem) ;
        int     getValue () ;
        int     testForTrue (int compOperator, int compValue) ;

```
void dataItemLong::copyValue (dataItemLong* sourceDataItem)
{
        int returnCode = sourceDataItem->testForValue() ;
        if returnCode
                return ;
        value = sourceDataItem->getValue () ;
        valueSet = ON ;
} int dataItemLong::getValue ()
{
        return (value) ;
} int dataItemLong::testForTrue (int compOperator, int compValue)
{
        if !valueSet
                return (0) ;
        switch (compOperator) {
        case (EQOP) :
                return (compValue == value) ;
                break ;
        case (NEQOP) :
                return (compValue != value) ;
                break ;
        case (GTOP) :
                return (compValue > value) ;
                break ;
        case (GEOP) :
                return (compValue >= value) ;
                break ;
        case (LTOP) :
                return (compValue < value) ;
                break ;
        case (LEOP) :
                return (compValue <= value) ;
                break ;
        }
}
```

Fig. 8

Process file input :
Decompose the process model into the FDL sections ;
Collect activity information ;
Linearize process graph ;
Sort control connectors ;
Create container items ;
Generate data mappings for container items ;
Re-structure exit condition ;
Re-structure transistion condition ;

Fig. 9 dataItemInstanceName->testForTrue(compOperator, compValue)

Fig. 11

Generate Program Header
Generate Program Body
Generate Program Trailer

Fig. 12

```
01    Create a collection for the activities

02    DO for all activities :
              IF activity has no incoming control connectors THEN
                      DO ;
03                        Move to new collection ;
04                        Increase number of current source activities ;
05                    END
06    END 07    DO until all control connectors are processed ;
08        DO for all current source activities ;
09            DO for all control connectors ;
10                IF control connector already processed THEN
                          continue ;
11                IF current activity not source of control connector
                          THEN
                              continue ;
12                Determine target activity ;
13                Flag control connector as processed ;
14                Increase number of processed incoming control
                          connectors in target activity ;
15                IF number of incoming control connectors is
                          equal number of processed incoming control
                          connectors THEN
                              DO ;
16                                Move target activity to new collection ;
17                                Increase number of new current source
                                      activities ;
18                            END ;
19            END ;
20        END ;
21        Determine next set of source activities ;
22    END ;
```

Fig. 10

```
#include headers for operating system specific code
#define's for enumerates etc.
definitions for variables include "activity.hpp"
include "dataitem.hpp"

int main (int argc, char* argv)
{
```

Fig. 13

```
Generate creation of all activities;

DO for all activities the generation of;
        Allocate output container items
        Check start condition
        Allocate input container items
        Map data to input container items
        Check exit condition - first part
        Invoke program
        Check exit condition - second part
        Check transition condition
        De-allocate input container items
END ;
```

Fig. 14

```
activity activityName = new activity ;
```

Fig. 15

```
01   if (activityName->getActualNrCCIn() > 0) {
02     if (activityName->getActualNrCCIn () == numberCCIn) {
```

Fig. 16

```
containerItem containerItemName = new containerItem ;
```

Fig. 17

```
if sourceActivity->activityExecuted {
        containerItemName -> copyValue (sourceContainerItemName) ;
}
```

Fig. 18

```
01   exitCondition = FALSE ;
02   while (exitCondition == FALSE) {
03     exitCondition = exitConditionStructured ;
04   }
```

Fig. 19

```
sd.PgmName = "d:\\pgma5.exe" ;
rc = DosStartSession (&sd, &ulSessionId, &pidProcess) ;
if      (rc == 0) {
        rc = DosReadQueue      (termQueue, &request, &datalength,
                                (PVOID*)&dataAddress, elementCode,
                                noWait, &elemPriority, semHandle);
        }
```

Fig. 20

```
01    otherwise = ON ;

02    if    (transitionConditionStructured) {
             otherwise = OFF ;
             targetActivityName->incrActualNrCCIn() ;
             }

03    if    (otherwise == ON) {
             targetActivityName->incrActualNrCCIn() ;
             }
```

Fig. 21

```
delete containerItemName ;
```

Fig. 22

```
/************************************************************
 * DATA-STRUCTURES
 ************************************************************/
STRUCTURE 'DataStructure1'
   'Field1':  STRING;
   'Field2':  LONG;
   'Field3':  FLOAT;
END 'DataStructure1'

STRUCTURE 'DataStructure2'
   'Field1':  STRING;
   'Field2':  LONG;
   'Field3':  FLOAT;
END 'DataStructure2'

STRUCTURE 'Default Data Structure'
END 'Default Data Structure'
```

Fig. 24A

```
/***********************************************
* PROGRAMS
***********************************************/
PROGRAM 'PgmA1' ( 'DataStructure1', 'DataStructure1' )
    PATH_AND_FILENAME  'd:\pgma1.exe'
END 'PgmA1'

PROGRAM 'PgmA2' ( 'DataStructure1', 'DataStructure1' )
    MINIMIZED
    PATH_AND_FILENAME  'd:\pgma2.exe'
END 'PgmA2'

PROGRAM 'PgmA3' ( 'DataStructure1', 'DataStructure1' )
    PATH_AND_FILENAME  'd:\pgma3.exe'
END 'PgmA3'

PROGRAM 'PgmA4' ( 'DataStructure2', 'DataStructure2' )
    PATH_AND_FILENAME  'd:\pgma4.exe'
END 'PgmA4'

PROGRAM 'PgmA5' ( 'DataStructure2', 'DataStructure2' )
    PATH_AND_FILENAME  'd:\pgma5.exe'
END 'PgmA5'

PROGRAM 'PgmA6' ( 'DataStructure2', 'DataStructure2' )
    PATH_AND_FILENAME  'd:\pgma6.cmd'
END 'PgmA6'
```

Fig. 24B

```
/***********************************************
*
* PROCESSES
*
***********************************************/

/***********************************************
* Description of Process FMCompTest1
***********************************************/
PROCESS 'FMCompTest1' ( 'Default Data Structure', 'Default Data Structure' )

PROGRAM_ACTIVITY 'A1'    ( 'DataStructure1', 'DataStructure1' )
        PROGRAM 'PgmA1'
        START AUTOMATIC WHEN AT_LEAST_ONE CONNECTOR TRUE
    END 'A1'

PROGRAM_ACTIVITY 'A2'    ( 'DataStructure1', 'DataStructure1' )
        PROGRAM 'PgmA2'
        START AUTOMATIC WHEN AT_LEAST_ONE CONNECTOR TRUE
        EXIT AUTOMATIC      WHEN 'Field1 = "10"'
    END 'A2'

PROGRAM_ACTIVITY 'A3'    ( 'DataStructure1', 'DataStructure1' )
        PROGRAM 'PgmA3'
        START MANUAL WHEN ALL CONNECTORS TRUE
    END 'A3'

PROGRAM_ACTIVITY 'A4'    ( 'DataStructure2', 'DataStructure2' )
        PROGRAM 'PgmA4'
        START AUTOMATIC WHEN AT_LEAST_ONE CONNECTOR TRUE
    END 'A4'

PROGRAM_ACTIVITY 'A5'    ( 'DataStructure2', 'DataStructure2' )
        PROGRAM 'PgmA5'
    END 'A5'

PROGRAM_ACTIVITY 'A6'    ( 'DataStructure2', 'DataStructure2' )
        PROGRAM 'PgmA6'
    END 'A6'
```

Fig. 24C1

```
CONTROL NAME 'CCA2A4' FROM 'A2'    TO 'A4'
    WHEN 'Field3 = 40'
CONTROL NAME 'CCA2A3' FROM 'A2'    TO 'A3'
    WHEN 'Field2 = 10'
CONTROL NAME 'CCA1A3' FROM 'A1'    TO 'A3'
CONTROL NAME 'CCA3A5' FROM 'A3'    TO 'A5'
    WHEN 'Field1 = "test"'
CONTROL NAME 'CCA4A5' FROM 'A4'    TO 'A5'
CONTROL FROM 'A3'    TO 'A6'
    OTHERWISE DATA FROM 'A1'       TO 'A6'
    MAP 'Field1'     TO 'Field1'
    MAP 'Field2'     TO 'Field2'
    MAP 'Field3'     TO 'Field3'
DATA FROM 'A2'       TO 'A4'
    MAP 'Field1'     TO 'Field1'
    MAP 'Field3'     TO 'Field3'
    MAP 'Field2'     TO 'Field2'
END 'FMCompTest1'
```

Fig. 24C2

CLASSES

```
class activity {
  int        actualNumberCCIn ;
  char activityExecutionStatus ;

public :

void   incrActualNrCCIn () ;
  int        getActualNrCCIn () ;
  void   setActivityExecuted () ;
  char   activityExecuted () ;
} ;

void activity::incrActualNrCCIn ()
{
  actualNumberCCIn++ ;
} int activity::getActualNrCCIn()
{
  return (actualNumberCCIn) ;
} void activity::setActivityExecuted () {
  activityExecutionStatus = ON ;
} char activity::activityExecuted () {
  return (activityExecutionStatus) ;
```

Fig. 25A

```
class dataItem {
protected :
   int     valueSet ;

public :

dataitem ()
   int     testForValue () ;
} ;

dataItem::dataItem()
{
   valueSet = OFF ;
} ;

int dataItem::testForValue ()
{
   return (valueSet) ;
}
```

Fig. 25B

```
class dataItemString : public dataItem {
  char*    value ;

public :

void   copyValue (dataItemString* sourceDataItem) ;
  char* getValue () ;
  int         testForTrue (int compOperator, char* compValue) ;
} ;

void dataItemString::copyValue (dataItemString* sourceDataItem)
{
  int returnCode = sourceDataItem->testForValue () ;
  if (returnCode) {
    return ;
  }
  char* sourceValue = sourceDataItem->getValue () ;
  if (valueSet) {
    delete value ;
  }
  value = new char [strlen(sourceValue)] ;
  strcpy(value,sourceValue) ;
} char* dataItemString::getValue()
{
  return (value) ;
} int dataItemString::testForTrue (int compOperator, char* compValue)
{
  if (!valueSet) {
    return (0) ;
  }
  int compareCode = strcmp(value,compValue) ;
  switch (compareCode) {
  case (0) :
```

Fig. 25C1

```
        if (compOperator == EQOP) {
            return (1) ;
        }
        if (compOperator == GEOP) {
            return (1) ;
        }
        if (compOperator == NEQOP) {
            return (0) ;
        }
    case (1) :
        if (compOperator == GTOP) {
            return (1) ;
        }
        break ;
    default :
        break ;
    }
}
```

Fig. 25C2

```
class dataItemLong : public dataItem {
   long    value ;

public :

void   copyValue (dataItemLong* sourceDataItem) ;
   long   getValue () ;
   int       testForTrue (int compOperator, long int compValue) ;
} ;

void dataItemLong::copyValue (dataItemLong* sourceDataItem)
{
   int returnCode = sourceDataItem->testForValue () ;
   if (returnCode) {
      return ;
   }
   value = sourceDataItem->getValue () ;
   valueSet = ON ;
} long dataItemLong::getValue ()
{
   return (value) ;
} int dataItemLong::testForTrue (int compOperator, long int compValue)
{
   if (!valueSet) {
      return (0) ;
   }
   switch (compOperator) {
   case (EQOP) :
      return (compValue == value) ;
      break ;
   case (NEQOP) :
      return (compValue != value) ;
      break ;
   case (GTOP) :
      return (compValue > value) ;
      break ;
```

Fig. 25D1

```
    case (GEOP) :
      return (compValue >= value) ;
      break ;
    case (LTOP) :
      return (compValue < value) ;
      break ;
    case (LEOP) :
      return (compValue <= value) ;
      break ;
    default :
      break ;
  }
}
```

Fig. 25D2

```
class dataItemFloat : public dataItem {
  float    value ;

public :

void   copyValue (dataItemFloat* sourceDataItem) ;
  float  getValue () ;
  int            testForTrue (int compOperator, float compValue) ;
} ;

void dataItemFloat::copyValue (dataItemFloat* sourceDataItem)
{
  int returnCode = sourceDataItem->testForValue () ;
  if (returnCode) {
    return ;
  }
  value = sourceDataItem->getValue () ;
  valueSet = ON ;
} float dataItemFloat::getValue ()
{
  return (value) ;
} int dataItemFloat::testForTrue (int compOperator, float compValue)
{
  if (!valueSet) {
    return (0) ;
  }
  switch (compOperator) {
  case (EQOP) :
    return (compValue == value) ;
    break ;
  case (NEQOP) :
    return (compValue != value) ;
    break ;
```

Fig. 25E1

```
case (GTOP) :
  return (compValue > value) ;
  break ;
case (GEOP) :
  return (compValue >= value) ;
  break ;
case (LTOP) :
  return (compValue < value) ;
  break ;
case (LEOP) :
  return (compValue <= value) ;
  break ;
default :
  break ;
  }
}
```

Fig. 25E2

```
#define INCL_DOSPROCESS
#define INCL_DOSSESMGR
#define INCL_DOSQUEUES
#include <os2.h>
#include <stdio.h>
#include <string.h>
include <stdlib.h> enum onoff {OFF,ON} ;
enum operators {EQOP, NEQOP, GTOP, LTOP, LEOP} ;

#include "activity.hpp"
include "dataitem.hpp"

int otherwise ;

STARTDATA       sd ;
PID             pidProcess ;
CHAR            szBuf[CCHMAXPATH] ;
ULONG           ulSessionId, cbWritten ;
APIRET          rc ;

STATUSDATA      stsdata ;
HQUEUE          termQueue ;
char* termQueueName = "\\queues\\term.que" ;
REQUESTDATA     request ;
ULONG           dataLength ;
PULONG          dataAddress ;
ULONG           elementCode ;
BOOL32          noWait ;
BYTE            elemPriority ;
HEV             semHandle ;

int main (int argc, char* argv[])
{
```

Fig. 26A1

```
int exitCondition ;

sd.Length = sizeof(sd) ;
sd.Related = SSF_RELATED_CHILD ;
sd.FgBg = SSF_FGBG_FORE ;
sd.TraceOpt = SSF_TRACEOPT_NONE ;
sd.PgmTitle = (PSZ) NULL ;
sd.PgmInputs = (PBYTE) NULL ;
sd.TermQ = (PBYTE) termQueueName ;
sd.InheritOpt = SSF_INHERTOPT_PARENT ;
sd.SessionType = SSF_TYPE_PM ;
sd.IconFile = (PSZ) NULL ;
sd.PgmControl = SSF_CONTROL_MAXIMIZE ;
sd.ObjectBuffer = szBuf ;
sd.ObjectBuffLen = sizeof(szBuf) ;

request.pid = pidProcess ;
noWait = 0 ;
semHandle = 0 ;
elementCode = 0 ;
rc = DosCreateQueue (termQueue, QUE_FIFO, termQueueName) ;

activity* A1 = new activity ;
activity* A2 = new activity ;
activity* A4 = new activity ;
activity* A3 = new activity ;
activity* A5 = new activity ;
activity* A6 = new activity ;

A1->incrActualNrCCIn() ;
```

Fig. 26A2

```
dataItemString* A1InField1 = new dataItemString ;
dataItemLong* A1InField2 = new dataItemLong ;
dataItemFloat* A1InField3 = new dataItemFloat ;

dataItemLong* A1Out_RC = new dataItemLong ;
dataItemString* A1OutField1 = new dataItemString ;
dataItemLong* A1OutField2 = new dataItemLong ;
dataItemFloat* A1OutField3 = new dataItemFloat ;

sd.PgmName = "d:\\pgma1.exe"
rc = DosStartSession (&sd, &ulSessionId, &pidProcess) ;

if (rc == 0) {
   rc = DosReadQueue   (termQueue, &request, &datalength,
                        (PVOID*)&data Address, elementCode,
                        noWait, &elemPriority, semHandle) ;
} delete A1InField1 ;
delete A1InField2 ;
delete A1InField3 ;

A3->incrActualNrCCIn() ;

A2->incrActualNrCCIn() ;

dataItemString* A2InField1 = new dataItemString ;
dataItemLong* A2InField2 = new dataItemLong ;
dataItemFloat* A2InField3 = new dataItemFloat ;

dataItemLong* A2Out_RC = new dataItemLong ;
dataItemString* A2OutField1 = new dataItemString ;
dataItemLong* A2OutField2 = new dataItemLong ;
dataItemFloat* A2OutField3 = new dataItemFloat ;
```

Fig. 26B1

```
exitCondition = FALSE ;
while (exitCondition == FALSE) {
  sd.PgmName = "d:\\pgma2.exe" ;
  rc = DosStartSession (&sd, &ulSessionId, &pidProcess) ;

if (rc == 0) {
     rc = DosReadQueue (termQueue, &request, &datalength,
                       (PVOID*)&data Address, elementCode,
                       noWait, &elemPriority, semHandle) ;
  } exitCondition = (A2OutField1->testForTrue(0,"10")) ;
} delete A2InField1 ;
delete A2InField2 ;
delete A2InField3 ;

if (A2OutField3->testForTrue(0,40)) {
  A4->incrActualNrCCIn() ;
}
if (A2OutField2->testForTrue(0,10)) {
  A3->incrActualNrCCIn() ;
}
```

Fig. 26B2

```
dataItemLong* A4Out_RC = new dataItemLong ;
dataItemString* A4OutField1 = new dataItemString ;
dataItemLong* A4OutField2 = new dataItemLong ;
dataItemFloat* A4OutField3 = new dataItemFloat ;

if (A4->getActualNrCCIn() >= 1) { dataItemString* A4InField1 = new dataItemString ;
  dataItemLong* A4InField2 = new dataItemLong ;
  dataItemFloat* A4InField3 = new dataItemFloat ;

if (A2->activityExecuted ()) {
    `A4InField1->copyValue(A2OutField1) ;
    A4InField3->copyValue(A2OutField3) ;
    A4InField2->copyValue(A2OutField2) ;
  } sd.PgmName = "d:\\pgma4.exe" ;
  rc = DosStartSession (&sd, &ulSessionId, &pidProcess) ;

if (rc == 0) {
    rc = DosReadQueue(termQueue, &request, &datalength,
                      (PVOID*)&dataAddress, elementCode,
                      noWait, &elemPriority, semHandle) ;
  } delete A4InField1 ;
  delete A4InField2 ;
  delete A4InField3 ;

A5->incrActualNrCCIn() ;
}
```

Fig. 26C

```
dataItemLong* A3Out_RC = new dataItemLong ;
dataItemString* A3OutField1 = new dataItemString ;
dataItemLong* A3OutField2 = new dataItemLong ;
dataItemFloat* A3OutField3 = new dataItemFloat ;

if (A3->getActualNrCCIn() == 2) { dataItemString* A3InField1 = new dataItemString ;
  dataItemLong* A3InField2 = new dataItemLong ;
  dataItemFloat* A3InField3 = new dataItemFloat ;

sd.PgmName = "d:\\pgma3.exe" ;
  rc = DosStartSession (&sd, &ulSessionId, &pidProcess) ;

if (rc == 0) {
      rc = DosReadQueue (termQueue, &request, &datalength,
                        (PVOID*)&data Address, elementCode,
                        noWait, &elemPriority, semHandle) ;
  } delete A3InField1 ;
  delete A3InField2 ;
  delete A3InField3 ;

otherwise = ON ;
  if (A3OutField1->testForTrue(0,"test")) {
    otherwise = OFF ;
    A5->incrActualNrCCIn() ;
  }
  if (otherwise == ON) {
    A6->incrActualNrCCIn() ;
  }
}
```

Fig. 26D

```
dataItemLong* A5Out_RC = new dataItemLong ;
dataItemString* A5OutField1 = new dataItemString ;
dataItemLong* A5OutField2 = new dataItemLong ;
dataItemFloat* A5OutField3 = new dataItemFloat ;

if (A5->getActualNrCCIn() == 2) { dataItemString* A5InField1 = new dataItemString ;
    dataItemLong* A5InField2 = new dataItemLong ;
    dataItemFloat* A5InField3 = new dataItemFloat ;

sd.PgmName = "d:\\pgma5.exe" ;
    rc = DosStartSession (&sd, &ulSessionId, &pidProcess) ;

if (rc == 0) {
        rc = DosReadQueue (termQueue, &request, &datalength,
                           (PVOID*)&data Address, elementCode,
                           noWait, &elemPriority, semHandle) ;
    } delete A5InField1 ;
    delete A5InField2 ;
    delete A5InField3 ;
}
```

Fig. 26E

```
dataItemLong* A6Out_RC = new dataItemLong ;
dataItemString* A6OutField1 = new dataItemString ;
dataItemLong* A6OutField2 = new dataItemLong ;
dataItemFloat* A6OutField3 = new dataItemFloat ;

if (A6->getActualNrCCIn() == 1) { dataItemString* A6InField1 = new dataItemString ;
   dataItemLong* A6InField2 = new dataItemLong ;
   dataItemFloat* A6InField3 = new dataItemFloat ;

if (A1->activityExecuted ()) {
      A6InField1->copyValue(A1OutField1) ;
      A6InField2->copyValue(A1OutField2) ;
      A6InField3->copyValue(A1OutField3) ;
   } sd.PgmName = "d:\\pgma6.cmd" ;
   rc = DosStartSession (&sd, &ulSessionId, &pidProcess) ;

if (rc == 0) {
      rc = DosReadQueue (termQueue, &request, &datalength,
                         (PVOID*)&data Address, elementCode,
                         noWait, &elemPriority, semHandle) ;
   } delete A6InField1 ;
   delete A6InField2 ;
   delete A6InField3 ;
 }
}
```

Fig. 26F

| IBM FlowMark Definition Language (FDL) | C++ Programming Language |
|---|---|
| program activity | activity class instance |
| input/output container | data item class instance |
| control connector | incrActualNrCCIn method of activity class |
| data connector | copyValue method of data item class |
| start condition | if statement with start condition as condition associated with getActualNrCCIn method |
| exit condition | if statement with exit condition |
| transition condition | (1) if statement with transistion condition as condition associated with incrActualNrCCIn method<br><br>(2) field comparison performed via testForTrue method of data item class |

Fig. 27

METHOD AND COMPUTER SYSTEM FOR GENERATING PROCESS MANAGEMENT COMPUTER PROGRAMS FROM PROCESS MODELS

TECHNICAL FIELD

The present invention relates to the technical field of process management on computer systems. More specifically, the present invention relates to the computerized and automatic generation of compilable and subsequent executable computer programs for a computer based management of processes starting from the process model.

BACKGROUND ART

The process of designing, developing and manufacturing a new product and the process of changing or adapting an existing product presents many challenges to product managers and engineers to bring the product to market for the least cost and within schedule while maintaining or even increasing product quality. Many companies are realizing that the conventional product design process is not satisfactory to meet these needs. They require early involvement of manufacturing engineering, cost engineering, logistic planning, procurement, manufacturing, service and support with the design effort. Furthermore, they require planning and control of product data through design, release, and manufacturing.

The correct and efficient execution of business processes within a company, e. g. development or production processes, is of enormous importance for a company and has significant influence on company's overall success in the market place. Therefore, those processes have to be regarded similar as technology processes and have to be tested, optimized and monitored. The management of such processes is usually performed and supported by a computer based process or workflow management system. One such process referred to throughout this patent pertains to FlowMark™, which is a trademark of International Business Machines (IBM) Corporation of Armonk, N.Y.

In D. J. Spoon: "Project Management Environment", IBM Technical Disclosure Bulletin, Vol. 32, No. a, February 1990, pages 250 to 254, a process management environment is described including an operating environment, data elements, and application functions and processes.

In R. T. Marshak: "IBM's FlowMark, Object-Oriented Workflow for Mission-Critical Applications", Workgroup Computing Report (USA), Vol. 17, No. 5, 1994, page 3 to 13, the object character of IBM FlowMark as a client/server product built on a true object model that is targeted for mission-critical production process application development and deployment is described.

In H. A. Inniss and J. H. Sheridan: "Workflow Management Based on an Object-Oriented Paradigm", IBM Technical Disclosure Bulletin, Vol. 37, No. 3, March 1994, page 185, other aspects of object-oriented modelling on customization and changes are described.

In F. Leymann and D. Roller: "Business Process Management with FlowMark", Digest of papers, Cat. No. 94CH3414-0, Spring COMPCON 94, 1994, pages 230 to 234, the state-of-the-art computer process management tool IBM FlowMark is described. The meta model of IBM FlowMark is presented as well as the implementation of IBM FlowMark. The possibilities of IBM FlowMark for modelling of business processes as well as their execution are discussed. The product IBM FlowMark is available for different computer platforms and documentation for IBM FlowMark is available in every IBM branch.

In F. Leymann: "A meta model to support the modelling and execution of processes", Proceedings of the 11th European Meeting on Cybernetics and System Research EMCR92, Vienna, Austria, Apr. 21 to 24, 1992, World Scientific 1992, pages 287 to 294, a meta model for controlling business processes is presented and discussed in detail.

The "IBM FlowMark for OS/2", document number GH 19-8215-01, IBM Corporation, 1994, available in every IBM sales office, represents a typical modern, sophisticated, and powerful workflow management system. It supports the modelling of business processes as a network of activities. This network of activities, the process model, is constructed as a directed, acyclic, weighted, colored graph. The nodes of the graph represent the activities which are performed. The edges of the graph, the control connectors, describe the potential sequence of execution of the activities. The runtime component of the workflow manager interprets the process graph and distributes the execution of activities to the right person at the right place, e. g. by assigning tasks to a work list according to the respective person, wherein said work list is stored as digital data within said workflow or process management computer system.

In F. Leymann and W. Altenhuber: "Managing business processes as an information resource", IBM Sytems Journal, Vol. 32(2), 1994, the mathematical theory underlying the IBM FlowMark product is described.

In D. Roller: "Verifikation von Workflows in IBM FlowMark", in J. Becker und G. Vossen (Hrsg.): "Geschaeftsprozessmodellierung und Workflows", International Thomson Publishing, 1995, the requirement and possibility of the verification of workflows is described. Furthermore the feature of graphical animation for verification of the process logic is presented as it is implemented within the IBM FlowMark product.

For implementing a computer based process management system, firstly the business processes have to be analyzed and, as the result of this analysis, a process model has to be constructed as a network of activities corresponding to the business process. In the IBM FlowMark product, the process models are not transformed into an executable. At run time, an instance of the process is created from the process model, called a process instance. This process instance is then interpreted dynamically by the IBM FlowMark product.

OBJECTS OF THE INVENTION

It is an object of the invention to provide, for a process managed by a computer system, a method and a computer system for transforming a network of activities and related data into an executable computer program for the computer based process management system.

It is another object of the invention to provide a computerized method for said transformation.

It is another object of the invention to provide a method and a computer system for transforming a process defined with the FlowMark Definition Language (FDL) into an executable computer program for the FlowMark workflow management system.

It is another object of the invention to provide a data carrier for storing a computer program implementing said inventive method on said inventive computer system.

SUMMARY OF THE INVENTION

The objects of the invention are fulfilled by the characteristics stated in enclosed independent claims. Further arrangements of the invention are disclosed in the according dependent claims.

The invention as described in independent claim 1 eliminates the limitations and disadvantages previously described for the prior art.

It is advantageous that the transformation from a network of activities into an executable computer program can be performed by a computer system resulting in a transformation at high speed, high reliability, and low cost. It is further advantageous that the transformation results in executable programs so that processing of a process instances is performed via the execution of a program rather than the dynamic interpretation of the underlying process graph by the process management system. This allows process instance management with significantly less resource consumption, e. g. with less computing and memory resources, at even higher speed. The linearization of the process model has to be performed only when the process model defines activities in parallel.

In one embodiment of the invention as described in claim 2 the process model constructs comprise activities with input and output containers comprising data items and the inventive method is mapping activities to instances of a first class of objects of the object oriented programming technique and is mapping data items in said containers to instances of a second class of objects of the object oriented programming technique.

It is advantageous that only two classes of objects are required, the activity class and the data item class. This reduces resource consumption and provides a clear structured scheme for reliable process management computer program generation. It is further advantageous that within the process management system the data are contained in specific data input and output containers associated to the activities of the process.

In a further embodiment of the invention as described in claims 3 and 4 the process model constructs comprise control and data connectors, both are mapped to method calls against the respective objects and further comprise start, transition, and exit conditions, also mapped to method calls against the respective objects.

This is advantageous since it allows the transformation of all usual process model constructs into object oriented programming constructs, thus allowing a complete transformation of a process model in a computer program with high speed and high reliability.

In a further embodiment of the invention as described in claim 5 the process model can be designed graphically.

This is advantageous because it allows the easy and fast design of a process model with subsequent computer based transformation of said process model into an compilable and executable computer program for managing said process modelled in said process model. The possibility of graphical process design allows high flexibility and high reliability while designing a new process model and while providing short design phases and quick response times to process model modifications. It is further advantageous that the IBM FlowMark system already provides the feature of graphical process design.

In a further embodiment of the invention as described in claims 6 and 7 the data item class is a base class. Data item classes for specific data types, such as FLOAT, LONG, or STRING, inherit from said base class.

This is advantageous because this allows to exploit the object oriented functionality of inheritance, so that the methods of the base class can be used by all classes which inherit from the base class.

In a further embodiment of the invention as described in claims 8 and 9 the inventive method uses the IBM Flow-Mark Definition Language (FDL) for the description of the process model as a process graph, and the inventive method uses the C++ programming language.

This is advantageous since both programming instruments are state of the art software tools providing high reliability and excellent support and further being held in high acceptance in the marketplace.

In a further embodiment of the invention as described in claims 10 to 14 the method of claims 1 to 9 is performed on a computer system resulting in all the advantages as already mentioned. It is worth mentioning, that the first and second computer systems of claims 10 to 14 can be indentical, thus forming one common computer system for process management as well as for generating the computer programs.

The invention as described in claim 15 provides the possibility of carrying a computer program according to the claims 1 to 9 on a computer system according to the claims 10 to 14.

It is advantageous that the data carrier allows the execution of the computer program on several computer systems, e.g. on clients and servers, or even on different computer platforms, e. g. Personal Computers, Work Station Computers or Main Frame Computers. The data carrier can store the information in a digital or analog manner using mechanical, electrical, magnetical or optical effects.

BRIEF DESCRIPTION OF THE DRAWINGS

FIG. 3 shows the header file of the activity class.

FIG. 4 shows the implementation file of the activity class.

FIG. 5 shows the header file of the data item base class.

FIG. 6 shows the implementation file of the data item base class.

FIG. 7 shows the header file of the data item long class.

FIG. 8 shows the implementation file of the data item long class.

FIG. 9 shows the pseudo code for the phase 1 of the generation of the C++ programm.

FIG. 10 shows the pseudo code for graph linearization.

FIG. 11 shows the comparison expression in exit conditions.

FIG. 12 shows the pseudo code for the phase 2 of the generation of the C++ program.

FIG. 13 shows the generated program header.

FIG. 14 shows the pseudo code for program body generation.

FIG. 15 shows an activity allocation statement.

FIG. 16 shows a check start condition statement.

FIG. 17 shows a container item allocation statement.

FIG. 18 shows a container item mapping statement.

FIG. 19 shows a check exit condition statement.

FIG. 20 shows a sample of program invocation.

FIG. 21 shows statements to check transition conditions.

FIG. 22 shows a deallocate container statement.

FIGS. 24A, 24B, 24C1, and 24C2 show the representation of the process of FIG. 23 in the FlowMark Definition Language (FDL).

FIGS. 25A, 25B, 25C1, 25C2, 25D1, 25D2, 25E1, and 25E2 show the various classes and methods necessary to generate the process management computer program for the process model in FIG. 23.

FIGS. 26A1, 26A2, 26B1, 26B2, 26C, 26D, 26E, and 26F show the generated C++ program generated using the method of the present invention.

FIG. 27 shows the mapping of the IBM FlowMark constructs onto the appropriate C++ constructs.

DESCRIPTION OF A PREFERRED EMBODIMENT

One preferred embodiment of a method and a system for generating process management computer programs from process models according to the present invention will be described in the following with references to the accompanying drawings.

Figure 1:
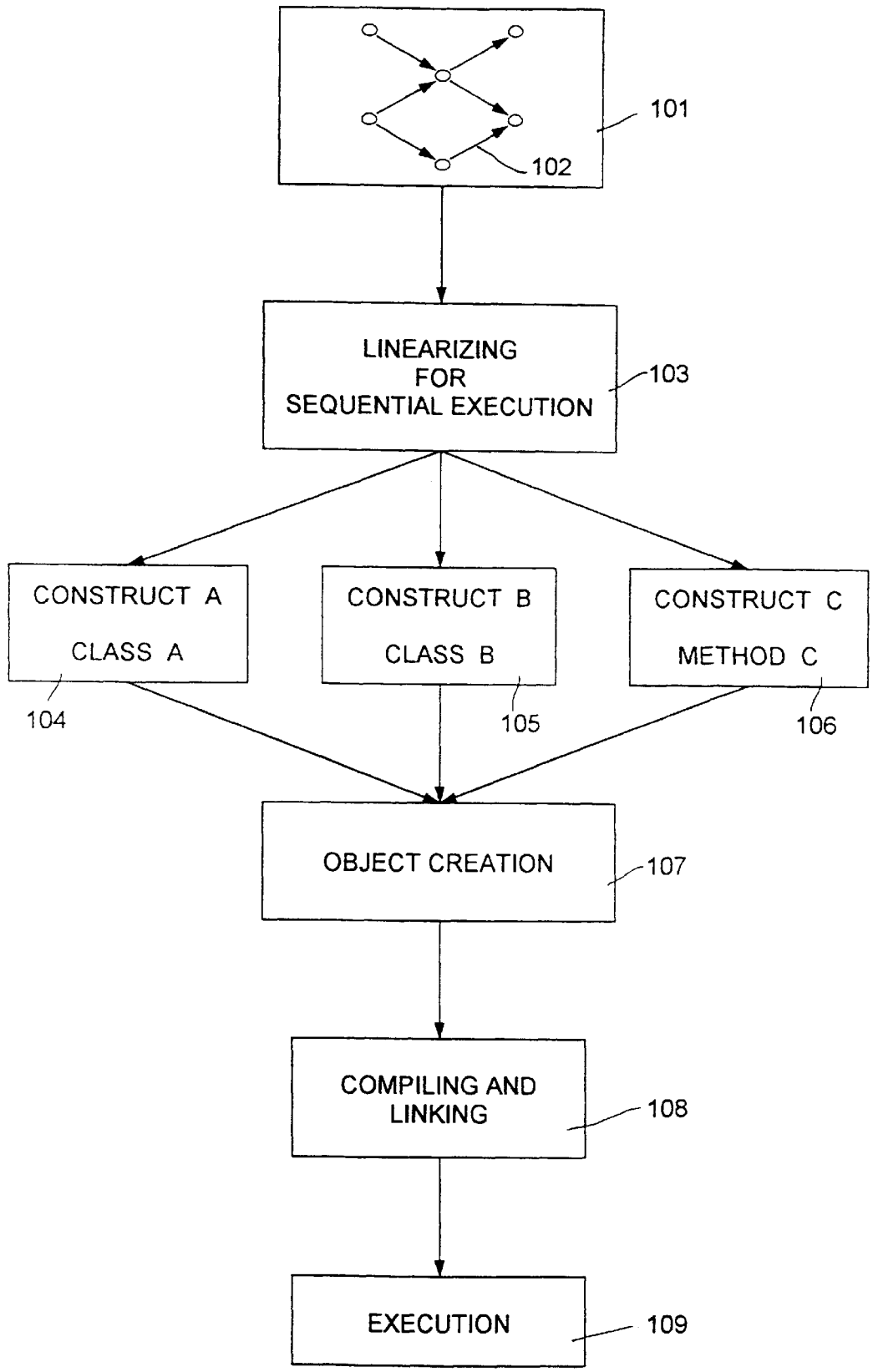
FIG. 1 shows a flow chart representing the inventive method for automatically generating computer programs for a process management computer system.

The FIG. 1 shows a flow chart of the inventive method for automatically generating computer programs for a process management computer system. The process model 101 is represented by a directed graph 102. The directed graph 102 can be built using the terminology and tools of the IBM FlowMark workflow management product. In a first relevant step the activities of the directed graph 102 have to be rearranged in a linearizing step 103 of the directed graph 102 in order to allow a sequential execution of the activities of the directed graph 102; this can be achieved using state of the art methodology or algorithms. Subsequently, the process model constructs of the process are transformed to objects and to method calls against said objects; this can be achieved using standard object oriented programming technology as for example represented by the C++ computer programming language or using any other programming technology.

In FIG. 1 is shown that a first process construct A is associated to a first object class A 104, a second process construct B is associated to a second object class B 105, and a third construct C is associated to a first method call C 106 against objects. In a further step, objects of said object classes are created 107 and said objects and methods are compiled and linked 108 into an executable computer program for execution 109 said process on a computer system, wherein the requirements of different computer platforms and operating systems can be fulfilled.

Figure 2:
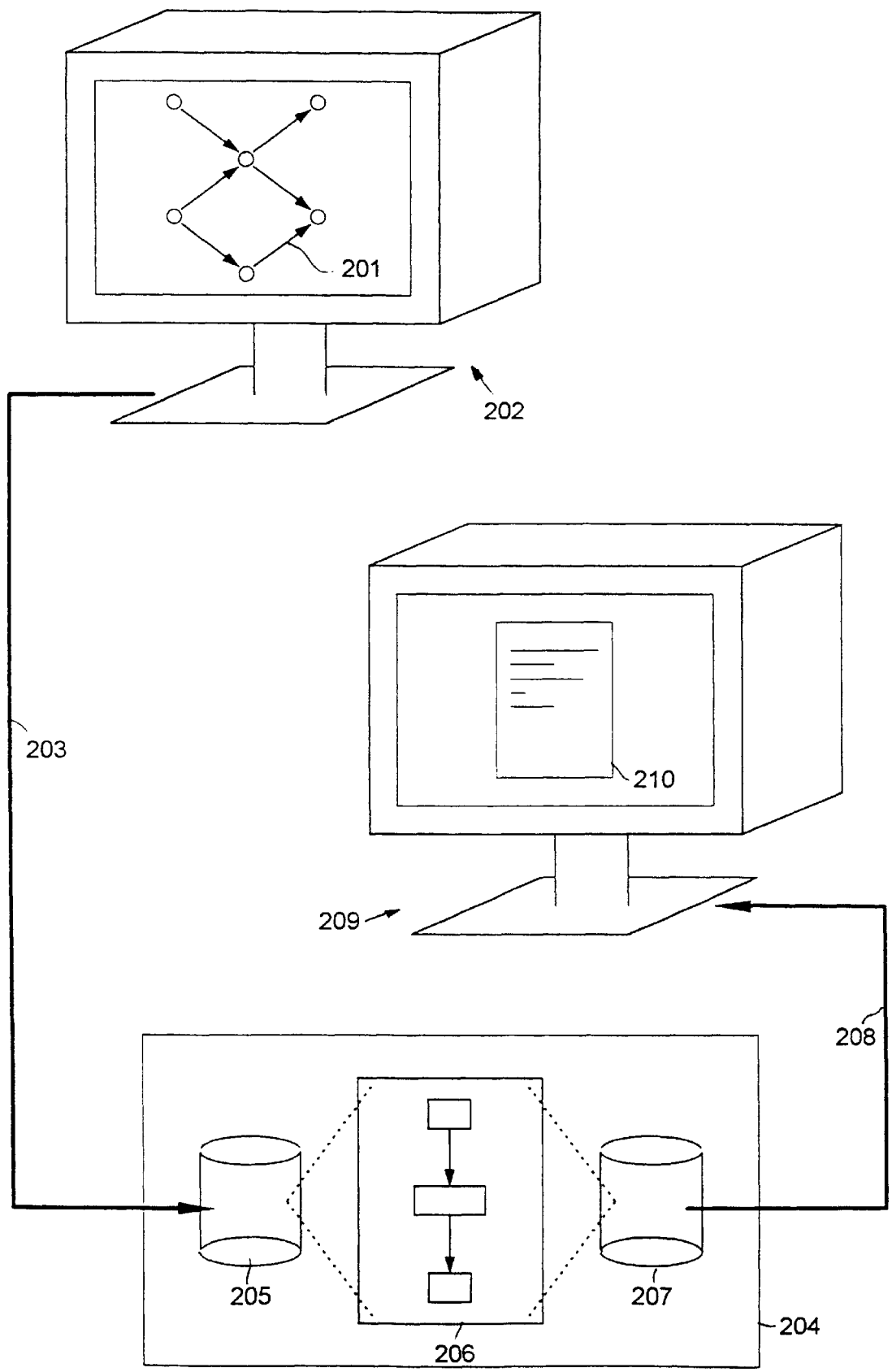
FIG. 2 shows one possible hardware configuration for implementing the inventive method of FIG. 1.

FIG. 2 shows one possible hardware configuration for implementing the inventive method of FIG. 1. The process to be managed is represented by a directed graph 201 on a first computer system 202. It is possible to design the process graphically by drawing the graph 201 on said first computer system 202. All relevant data of the designed process are transformed as digital data via data line 203 to a second computer system 204 and are stored digitally in a first storage means 205 within said second computer system 204. Said second computer system 204 performs the inventive method 206 of automatically generating computer programs for a process managed by a computer system. The results of the inventive method, executable process management computer programs, are stored digitally in a second storage means 207 within said-second computer system 204. Said first and second storage means 205 and 207 can be realized by every digital storage means, either a magnetic disk, an optical storage media, or an electronic memory as e. g. a Random Access Memory.(RAM).

The executable process management computer programs are subsequently transformed via data line 208 to a third computer system 209 on which the process management is performed, e. g. by starting a computer program on a computer system or by starting and controlling a manufacturing apparatus. The executable process management computer programs can be transformed to multiple computer systems, each of said computer systems are associated with said process management. Said data lines 203 and 208 can be realized as wired parallel or serial data lines as well as wireless optical or radio transmissions. It is possible to perform the process design, the automatical generation of the process management computer programs, and the process management itself on just one computer system, either using a stand alone, a host/terminal, or a client/server computer hardware configuration.

The present invention describes an algorithm to generate C++ programs from those process models which are executed by one person at one time at one place consecutively. The generated C++ programs can be compiled into executables. The generation of the C++ program is based on the fundamental idea of representing activities and container items as instances of C++ classes, control and data connectors as method invocations against instances of C++ classes, and linearizing the process graph with respect to the sequence of activity execution. This is translated into a sequence of method invocations on those C++ class instances. The process model is specified in the form of IBM FlowMark Definition Language (FDL) statements. The process model can be constructed either via the export function of IBM FlowMark, created with the help of any ASCII editor, or produced by a modelling tool, which can generate process models in the form of IBM FlowMark Definition Language. The present invention provides the following capabilities:

Process instances can be executed with significantly less resource consumption for managing the process instances.

If changes to data bases are only performed in the last activity, the complete process is a transaction, i. e. the complete process has the ACID (Atomicity—Consistency—Isolation—Durability) property.

The IBM FlowMark Definition Language can be used also as a scripting language for constructing programs. This allows to use the IBM FlowMark Definition Language as the only language for the construction of workflow based applications.

Before describing the embodiment of the invention in more detail, a short description of the syntactical elements of the IBM FlowMark for OS/2 process meta model is presented. Its purpose is to help comprehending the later descriptions of the various steps in generating the C++ program. The level of details is restricted to the constructs required for the construction of the C++ program. A detailed description can be found in the afore mentioned product doumentation of IBM FlowMark for OS/2.

ACTIVITIES are the nodes of the process graph. An activity is implemented as a program. The activity references the program via the name of a program object, which contains the physical properties of the program, such as name and environment information. The program is invoked synchronously. An activity with no incoming control connectors is called a start activity, an activity without outgoing control connectors is called an end activity.

Every activity is associated with an INPUT CONTAINER and an OUTPUT CONTAINER. The structure of the containers is defined by referencing data structure objects. A data structure defines a set of data items. A data item may either be a basic type, such as String, Integer, or Float, or another data structure. The input container contains the input to the activity, the output container contains the output of the activity. The programs implementing the activities access the input and output containers via an application programming interface.

The edges or CONTROL CONNECTORS of the process graph describe the potential flow of control through the process graph. The activity at the start point of the edge is called the source activity, the activity at the end point of the edge is called the target activity.

Every control connector can be associated with a TRANSITION CONDITION, the weight of the graph. The transition condition is a boolean expression, whose parameters are data items in the output containers of the current and all previously executed activities. After an activity has terminated, all outgoing control connectors are evaluated and the truth value of each control connector is calculated via the actual values of the data items. Only those activities are considered as potentially executable, which are the target of edges, which evaluated to true. The special transition condition "otherwise" allows to specify that the associated control connector evaluates to true if all other control connectors evaluate to false.

Every activity can be associated with an EXIT CONDITION, the color of the graph. The exit condition is a boolean expression, whose parameters are data items in the output container of the activity. After the program implementing the activity has terminated, the truth value of the exit condition is calculated via the actual values of the output container data items. If the exit condition evaluates to false, the activity is executed again. If the exit condition evaluates to true, the activity is terminated.

If an activity is the starting point of multiple control connectors, the activities at the end of the edges are executed in parallel ("fork"). If an activity is the end of multiple control connectors ("join") this activity serves as a synchronization point. A START CONDITION determines under which condition such an activity can be started e.g. whether all incoming control connectors must be true or at least one must be true.

The contents of the input and output containers of an activity are only known to this activity. DATA CONNECTORS provide the capability to map data items in the output container of an activity to the input container of a subsequent activity.

Generation of the C++ program is done using the following basic concepts:
  The process graph is linearized via an algorithm, so that all activities are executed sequentially.
  Activities and data items in the input and output containers are instances of C++ classes: the activity class and the data item class.
  Data connectors are mapped to C++ expressions with method calls against instances of the data item classes.
  Start conditions are mapped to C++ expressions against instances of the activity class.
  Transition and exit conditions are mapped to C++ expressions with method calls against instances of the data item and activity classes.

The generation of the C++ program is performed in two stages:
  Phase 1 reads the information in the FDL file, extracts the required information, generates the objects, linearizes the activities, and links the objects together properly.

Phase 2 generates the C++ program.

The activity class and the data item class are the only classes in the generated C++ program. Each activity of the process graph is represented by an instance of the activity class. The FIG. 3 shows the header file of an activity class. Data member "actualNumberCCIn" holds the number of incoming control connectors which evaluate to true at execution time; data member "activityExecutedStatus" is set to 1, if the activity has been executed during execution time.

The FIG. 4 shows the implementation file of an activity class. The method "incrActualNrCCIn ()" increases the number of actual incoming control connectors. It is invoked when a control connector evaluates to true. The method "getActualNumberCCIn ()" returns the number of the control connectors which have evaluated to true. Both functions are used to evaluate the start condition. The method "setActivityExecuted" is used to indicate that the activity has been executed and the method "activityExecuted" is used to test whether the activity has executed; both functions are required to determine for an activity for which of the data connectors the mapping of fields has to be performed.

Each item in the input and output container is an instance of one of three data item class. These three data item classes inherit from the data item base class. The FIG. 5 shows the header file of the data item base class. The Data member "valueSet" is used to indicate whether the instance holds a value or not.

The FIG. 6 shows the implementation file of the data item base class. The method "testForValue" is used to test whether the instance holds a value or not.

There are three data item classes, one for each of the supported data types STRING, LONG, and FLOAT. They all have one data member "value" which holds the actual value. The type of the data member is STRING, LONG, or FLOAT. The FIG. 7 shows the header file of the data item class for the basic type LONG and FIG. 8 shows an implementation file of the data item for the basic type LONG. The method "copyVaue(dataItem* sourceDataItem)" copies the value from the source data item. The method "getvalue()" returns the value of the data item. The method "testForTrue (int compoperator, int compvalue)" returns the truth value of the comparison of the data item instance value with the comparison value ("compValue") using the comparison operator ("compOperator"). The comparison operator is encoded into an integer.

The FIG. 9 shows the pseudo code of phase 1 of the generation of the C++ program. PROCESS INPUT is performed as inputting the complete set of FlowMark Definition Language (FDL) statements for the process model to be processed. The FDL file is scanned and the information is stored into collections, one for each of the FDL sections programs, activities, data structures, control connectors, and data connectors. ACTIVITY INFORMATION is collected by determining for each activity the number of incoming control connectors in order to generate the proper start conditions.

As the end user processes one activity after the other, the PROCESS GRAPH must be LINEARIZED. The FIG. 10 shows an algorithm to rearrange the activities:
  Line 01 allocates a new collection for the activities. This new collection is used to store the activities in the linearized sequence.
  Lines 04 through 06 determine the start activities of the process graph. Start activities are characterized by not being the target of a control connector. They are also by definition the source of control connectors, if any.
  Lines 07 through 22 perform a loop over all control connectors. It is terminated when all control connectors are processed. In this case, all activities have been moved to the new collection.

Lines 08 through 20 are performed for each activity which is currently a source for control connectors. The purpose of processing is to determine the activities which are target of those control connectors.

Lines 09 through 19 determine the control connectors for which the current activity is the source activity and then determine the proper target activities. Line 10 skips those control connectors which have already been processed. Line 11 ignores those control connectors whose source activity is different. Line 12 determines the target activity. Line 13 flags the control connector as processed. Line 14 increases for the target activity the number of control connectors which have been processed for the activity. Line 15 determines if all incoming control connectors have been processed. If this is true, then the activity can be moved to the new collection and serves as a source activity after the current round of source activities has been processed. Line 17 increases the number of new source activities to be processed in the next round.

Line 21 is executed after all current source activities are processed. It prepares the set of selected target activities as new source activities which need to be processed.

Of all the control connectors leaving an activity, the control connector specified with "otherwise" evaluates to true only if none of the other control connectors evaluate to true. This step SORTS THE CONTROL CONNECTORS within each activity so that the otherwise control connector is the last control connector to be processed.

Each input and output container of an activity is associated with a named data structure. The data structure is a set of basic data type and other data structures. The basic data types are STRING, LONG, and FLOAT. For each of the basic items a DATA ITEM will be CREATED as an instance of the data item class within the generated C++ code. A unique name is generated for each container item which is used as the name of the object in the generated C++ program.

Mapping of output container information to input container information is defined via data connectors. Which data items are mapped to which data item is specified via the special keyword MAP. This step creates for each activity a set of CONTAINER ITEM MAPPINGS using the unique names generated for the container items. Mapping is sorted by data connector with the data connector with the earliest source activity is being processed first.

The EXIT CONDITIONS contain syntactically correct boolean expressions. This basic structure is left intact and is imbedded directly in the generated C++ program. This allows to easily determine the truth value of the exit condition. The only change is the RESTRUCTURING of the field comparison expression, which are of the form "field_ name operator comparison value". This is changed into an expression as shown in FIG. 11. The TRANSITION CONDITIONS are RESTRUCTURED and changed the same way as the exit conditions.

The FIG. 12 shows the pseudo code for phase 2 of the program generation. The GENERATION of the PROGRAM HEADER includes the insertion of the constructs shown in FIG. 13 into the C++ program file. The pseudo code shown in FIG. 14 GENERATES the BODY of the C++ program. For each activity an instance of activity class is generated thereby CREATING the ACTIVITIES. The appropriate statement is shown in FIG. 15. For each output container item an instance of the appropriate data item class is created thereby ALLOCATING the OUTPUT CONTAINER ITEMS. The items are generated here so that they can be found by the C++ compiler when they are referenced within the if statement generated for the start condition.

The START CONDITION is CHECKED by one of the statements shown in FIG. 16:

Line 01 is generated if the start condition is defined as "At least one control connector is true". The data member "actualNrCCIn" contains the number of incoming control connectors which evaluated to true; method getActualNrCCIn() returns this number. The start condition is therefore true if this number is greater 0, i. e. at least one incoming control connector evaluated to true.

Line 02 is generated if the start condition is defined as "All control connectors must be true". If the number returned by "getActualNrCCIn()" and the literal numberCCIN, which represents the number of incoming control connectors, are equal, the start condition is met.

For each INPUT CONTAINER ITEM an instance of the appropriate data item class is created. The object name is the unique name generated during container item creation. The appropriate statement is shown in FIG. 17. If the input container is the target of a data connector, the DATA for the INPUT CONTAINER item is COPIED from a container item of a previous output container item with the statement shown in FIG. 18. It is checked that the source activity has been executed and therefor the output container had been allocated.

The code fragment listed in FIG. 19 implements the EXIT CONDITION for an activity:

Lines 01 and 02 are generated now.

Lines 03 and 04 are generated after the program invocation has been generated.

The code GENERATED for the PROGRAM INVOCATION depends on the implementation of the program and the operating system on which the generated program will execute. The FIG. 20 shows the invocation of an OS/2 program in a separate OS/2 session, when the generated program executes under OS/2. The generated program waits until the called program completes. Lines 03 and 04 of the EXIT CONDITION shown in FIG. 19 are now inserted into the file.

The FIG. 21 shows the statements generated for CHECKING the TRANSITION CONDITIONS associated with the control connectors:

Line 01 is generated if at least one outgoing control connector is defined with otherwise.

Line 02 is generated for each control connector leaving the actiity. The expression "transitionConditionStructured" has been generated in phase 1. If the transition condition is true, the otherwise indicator is turned off and the number of incoming control connectors in the target activity which evaluate to true is increased by executing the method "incrActualNrCCIn()" on the target activity object.

Line 03 is generated for the otherwise control connector. It is executed if none of the other control connectors evaluated to true, and therefore the variable otherwise was never reset to OFF.

All data items of the input container are DEALLOCATED by the statement in FIG. 22. The PROGRAM TRAILER GENERATION completes the generated program with any required information. Currently this is only a closing bracket.

The FIGS. 23 to 27 show an example for generating process management computer programs from a process model. A six activity network is used to describe the generation of the inventive method.

Figure 23:
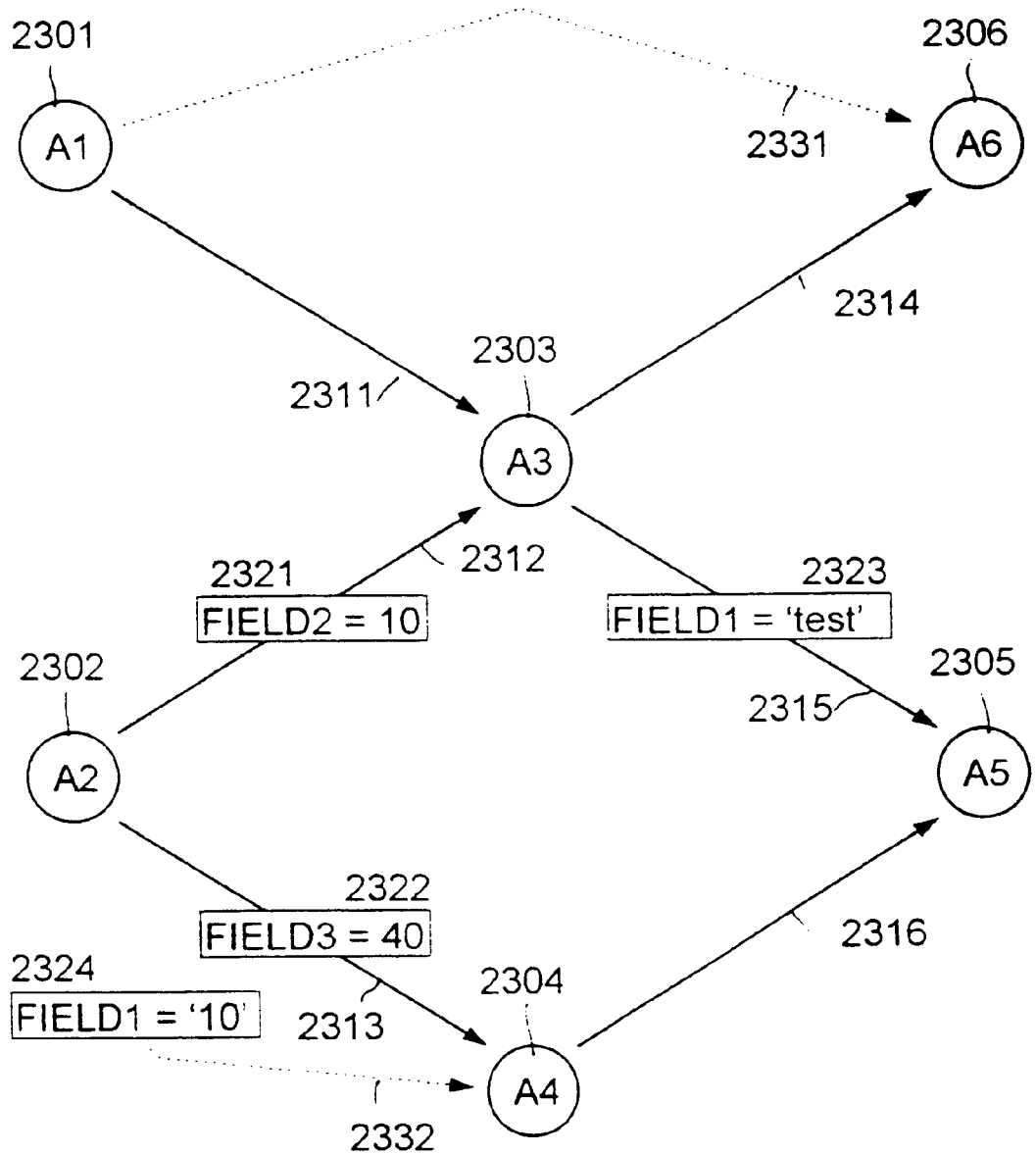
FIG. 23 shows a process model in graphical representation as a directed graph.

The FIG. 23 shows a process model in graphical representation using the editor of the IBM FlowMark product. The six activities A1 to A6 2301, 2302, 2303, 2304, 2305, and 2306 are shown with control connectors 2311, 2312, 2313, 2314, 2315, and 2316. The control connectors 2312 is associated with a transition condition 2321, the control connectors 2313 is associated with a transition condition 2322, and the control connectors 2315 is associated with a transition condition 2323. Data connector 2331 is associated to activity A1 2301 and activity A6 2306 and also data connector 2332 is associated to activity A2 2302 and activity A4 2304. The exit condition 2324 is associated with the activity A2 2302.

The FIGS. 24A, 24B, 24C1, and 24C2 show the representation of the process of FIG. 23 in the FlowMark Definition Language (FDL). The FIG. 24A shows the data structures according to FIG. 23, the FIG. 24B shows the programs and the FIGS. 24C1 and FIG. 24C2 show the description of the process represented in FIG. 23.

The FIGS. 25A, 25B, 25C1, 25C2, 25D1, 25D2, 25E1, and 25E2 show the various classes and methods necessary to generate the process management computer program for the process model in FIG. 23.

The FIGS. 26A1, 26A2, 26B, 26C, 26D, 26E, and 26F show the generated C++ program generated using the method of the present invention. For example, on top of FIG. 26B the input ("AllInFieldl") and output ("AlOut_RC") container of activity A1 2301 is described. The meaning of the C++ program lines is self-explaining with regard to the state of the art programming technique of C++ and IBM FlowMark. The FIG. 27 shows the mapping of the IBM FlowMark constructs onto the appropriate C++ constructs.

What is claimed is:

1. A computerized method for automatically generating computer programs for a process executed by one person at one time at one place consecutively and managed by a computer system (209), wherein said process is represented by a process model (101), said process model (101) comprises process model constructs (104, 105, and 106), activities (2301, 2302, 2303, 2304, 2305, and 2306), and input and output containers, said input and output containers comprise data items and are associated to said activities (2301, 2302, 2303, 2304, 2305, and 2306), and said method including an object oriented programming technique;

said method comprising the steps of:
 starting from said process model (101),
 linearizing said process model (101), so that said process model (101) including said activities (2301, 2302, 2303, 2304, 2305, and 2306) are executed sequentially, associating said process model constructs to classes (104, 105) of objects of said object oriented programming technique and to method calls (106) against said objects,
 mapping said activities (2301, 2302, 2303, 2304, 2305, and 2306) to instances of a first class (104) of objects, the activity class,
 mapping said data items in said input and output containers to instances of a second class (105) of objects, the data item class,
 generating objects (107) as instances of said classes of objects, and
 compiling and linking (108) said generated objects (104, 105) and said methods (106) into executable computer programs for executing (109) said process which is managed by said computer system (209).

2. The method according to claim 1, wherein said process model (101) further comprise:
 control connectors (2311, 2312, 2313, 2314, 2315, and 2316) for controlling the sequence of said activities (2301, 2302, 2303, 2304, 2305, and 2306), and
 data connectors (2321, 2322) for exchanging data between said activities (2301, 2302, 2303, 2304, 2305, and 2306);
 said method further comprises the steps of:
 mapping said control connectors (2311, 2312, 2313, 2314, 2315, and 2316) to first method calls (106) corresponding to said control connectors (2311, 2312, 2313, 2314, 2315, and 2316) against said objects of said activity class (104), and
 mapping said data connectors (2321, 2322) to second method calls (106) corresponding to said data connectors (2321, 2322) against said objects of said data item class (105).

3. The method according to any one of claims 1 or 2, wherein said process model (101) further comprise:
 start conditions associated to said activities (2301, 2302, 2303, 2304, 2305, and 2306) for determining under which condition said respective activity can be started,
 transition conditions (2321, 2322, and 2323) associated to said control connectors (2312, 2313, and 2315) for determining whether said activities (2301, 2302, 2303, 2304, 2305, and 2306) can be started, and
 exit conditions associated with said activities (2301, 2302, 2303, 2304, 2305, and 2306) for determining whether said activity is executed again or whether said activity is terminated;
 said method further comprises the steps of:
 mapping said start conditions to third method calls (106) corresponding to said start conditions against objects of said activity class (104),
 mapping said transition conditions to statements corresponding to said transition conditions with fourth method calls (106) against objects of said activity class (104) and against objects of said data item class (105), and
 mapping said exit conditions to statements corresponding to said exit conditions with fifth method calls against objects of said data item class (105).

4. The method according to any one of claims 1 or 2, wherein said process model (101) can be designed and/or varied graphically on a computer based process management system (202), especially on the IBM FlowMark system.

5. The method according to any one of claims 1 or 2, wherein said second class (105) of objects, the data item class, is a data item base class, said data item base class comprises multiple data item classes, and said data item classes inherit from said data item base class.

6. The method according to any one of claims 1 or 2, wherein said data item classes support different data types, particularly support three data types STRING, LONG, and FLOAT.

7. The method according to any one of claims 1 or 2, wherein said process model (101) is a process graph (102), said process graph (102) is described using the IBM FlowMark Definition Language (FDL).

8. The method according to any one of claims 1 or 2, wherein said classes of objects are classes of objects of the C++ programming language.

9. A first computer system (204) for automatically generating computer programs for a process executed by one user at one time at one place consecutively and managed by a second computer system (209), wherein said first computer system (204) including an object oriented programming technique, said process is represented by a process model (101) comprising a process graph (102), said process graph (102) can be designed and/or varied, and is described using IBM FlowMark Definition Language, and said process model (101) comprises process model constructs (104, 105, and 106), said process model constructs (104, 105, and 106) representing said process model (101);

said first computer system (204) comprising:

means for linearizing said process model (101) comprising said process graph (102), so that said process model (101) is executed sequentially, means for associating said process model constructs to classes of objects (104, 105) of said object oriented programming technique and to method calls (106) against said objects, means for generating objects (107) as instances of said classes of objects, and means for compiling and linking (108) said generated objects and said methods into executable computer programs for executing said process which is managed by said second computer system (209).

10. The first computer system (204) according to claim 9, wherein said process model constructs (104, 105, and 106) comprise activities (2301, 2302, 2303, 2304, 2305, and 2306), said activities (2301, 2302, 2303, 2304, 2305, and 2306) are associated with input and output containers, said input and output containers are associated with data items, and said input and output containers are associated to said activities (2301, 2302, 2303, 2304, 2305, and 2306), said linearizing said process model (101) is a linearizing so that said activities (2301, 2302, 2303, 2304, 2305, and 2306) are executed sequentially;

said first computer system (204) further comprising:

means for mapping said activities (2301, 2302, 2303, 2304, 2305, and 2306) to instances of a first class of objects (104), the activity class, and means for mapping said data items in said input and output containers to instances of a second class of objects (105), the data item class.

11. The first computer system according to any one of claims 9–10, wherein said process model constructs (104, 105, and 106) further comprise:

control connectors (2311, 2312, 2313, 2314, 2315, and 2316) for controlling the sequence of said activities (2301, 2302, 2303, 2304, 2305, and 2306), and data connectors (2321, 2322) for exchanging data between said activities (2301, 2302, 2303, 2304, 2305, and 2306), start conditions associated to said activities (2301, 2302, 2303, 2304, 2305, and 2306) for determining under which condition said respective activity can be started, transition conditions (2321, 2322, and 2323) associated to said control connectors (2311, 2312, 2313, 2314, 2315, and 2316) for determining whether said activities (2301, 2302, 2303, 2304, 2305, and 2306) can be started, and exit conditions associated with said activities (2301, 2302, 2303, 2304, 2305, and 2306) for determining whether said activity is executed again or whether said activity is terminated;

said first computer system (204) further comprising:

means for mapping said control connectors (2311, 2312, 2313, 2314, 2315, and 2316) to first method calls (106) corresponding to said control connectors (2311, 2312, 2313, 2314, 2315, and 2316) against said objects of said activity class (104), means for mapping said data connectors (2321, 2322) to second method calls (106) corresponding to said data connectors (2321, 2322) against said objects of said data item class (105), means for mapping said start conditions to third method calls (106) corresponding to said start conditions against objects of said activity class (104), means for mapping said transition conditions (2321, 2322, and 2323) to statements corresponding to said transition conditions (2321, 2322, and 2323) with fourth method calls (106) against objects of said activity class (104) and against objects of said data item class (105), and means for mapping said exit conditions to statements corresponding to said exit conditions with fifth method calls (106) against objects of said data item class (105).

12. The first computer system according to any one of claims 9–10, wherein said process model (101) can be designed and/or varied graphically on a computer based process management system (202);

said second class of objects (105), the data item class, is a data item base class, said data item base class (105) comprises multiple data item classes, and said data item classes (105) inherit from said data item base class;

said data item classes support different data types, particularly support three data types STRING, LONG, and FLOAT; and said classes of objects are classes (104, 105, and 106) of objects of the C++ programming language.

13. A data carrier storing a computer program, wherein said computer program is controlling a computer system (209) according to any one of claims 10–11 carrying out a method according to any one of claims 1 or 2.

14. A data carrier storing a computer program, wherein said computer program is executable to control a computer system (209) according to claim 9 carrying out a method according to claim 1.

* * * * *